United States Patent [19]

Leone et al.

[11] 4,026,003

[45] May 31, 1977

[54] METHOD AND APPARATUS FOR BREAKING AND STRIPPING HOSE FROM A MANDREL

[75] Inventors: Anthony R. Leone, Hamilton Square, N.J.; Andrew Yakim, Yardley, Pa.

[73] Assignee: Acme-Hamilton Manufacturing Corporation, Trenton, N.J.

[22] Filed: Mar. 26, 1976

[21] Appl. No.: 670,699

[52] U.S. Cl. .................................. 29/427; 29/235
[51] Int. Cl.$^2$ ............................................ B23D 9/02
[58] Field of Search ............ 29/426, 427, 234, 235, 29/450, 200 B, 252; 81/9.51

[56] References Cited

UNITED STATES PATENTS

| | | | |
|---|---|---|---|
| 2,099,843 | 11/1937 | Connell | 29/235 UX |
| 3,010,194 | 11/1961 | Fratzke | 29/235 |
| 3,104,459 | 9/1963 | Wendt | 29/427 X |
| 3,137,384 | 6/1964 | Perret | 29/235 X |
| 3,171,306 | 3/1965 | Mirsch | 81/9.51 |
| 3,267,774 | 8/1966 | Bilco et al. | 81/9.51 |
| 3,621,560 | 11/1971 | Le Bright | 29/427 |
| 3,832,767 | 9/1974 | Petree | 29/427 |
| 3,946,483 | 3/1976 | Holden et al. | 29/427 |

*Primary Examiner*—James R. Duzan
*Attorney, Agent, or Firm*—Ostrolenk, Faber, Gerb & Soffen

[57] ABSTRACT

Hose is stripped from a mandrel by urging the tapered end of an annular nozzle at least partially beneath one end of the completed hose. Air under pressure is led to an annular shaped region defined and cooperatively formed by the nozzle and the mandrel to pass beyond the tapered end of the nozzle and between the inner surface of the hose and the outer surface of the mandrel, thereby "breaking" the hose away from the mandrel and lifting the hose away from the mandrel to greatly facilitate stripping of the hose from the mandrel. The nozzle assembly is driven in a linear direction to push or "strip" the hose from the mandrel.

The end of the nozzle remote from the hose is provided with a sliding seal which facilitates movement of the nozzle along the mandrel as the hose is stripped therefrom while preventing the escape of the pressurized air.

12 Claims, 3 Drawing Figures

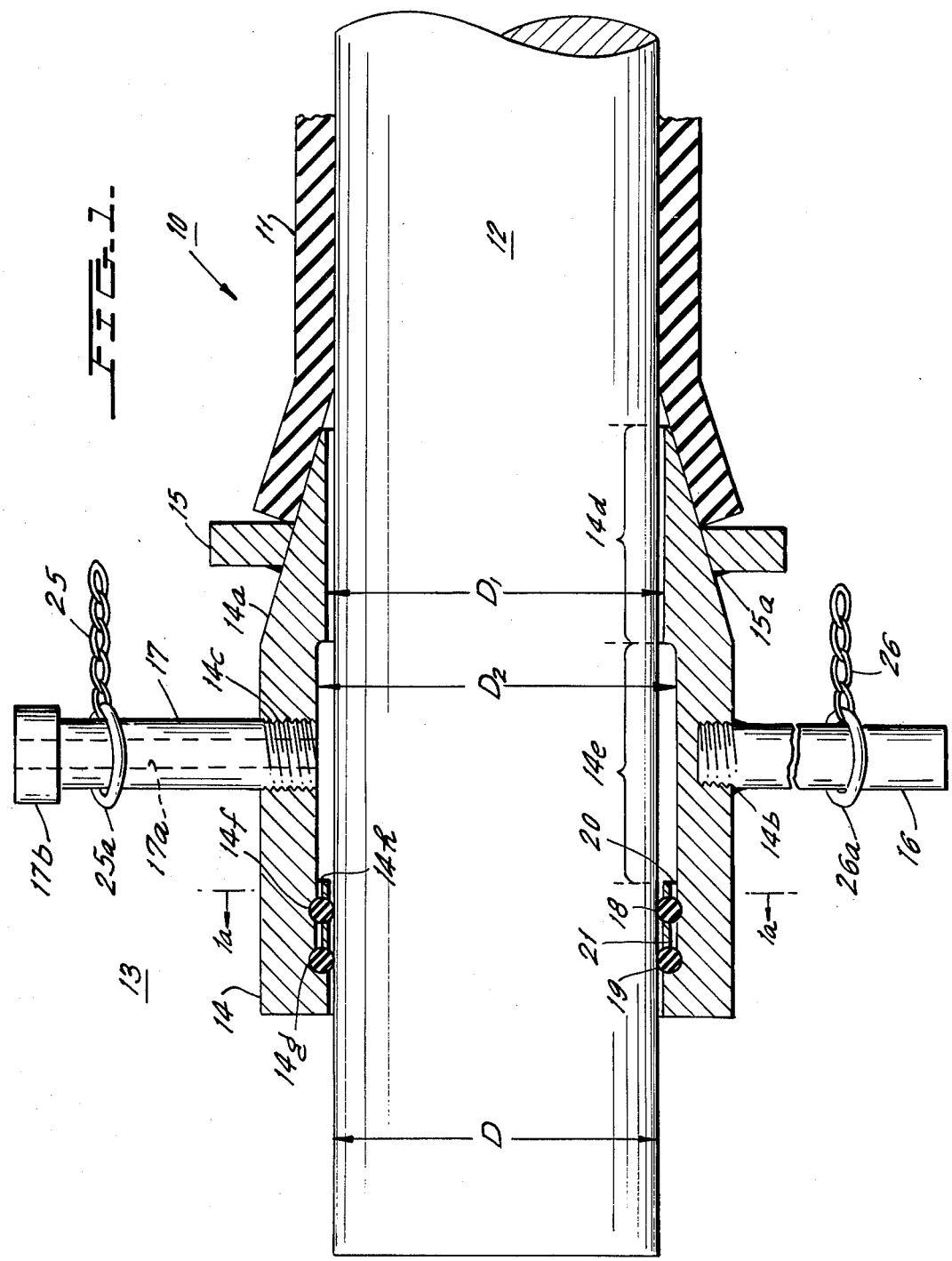

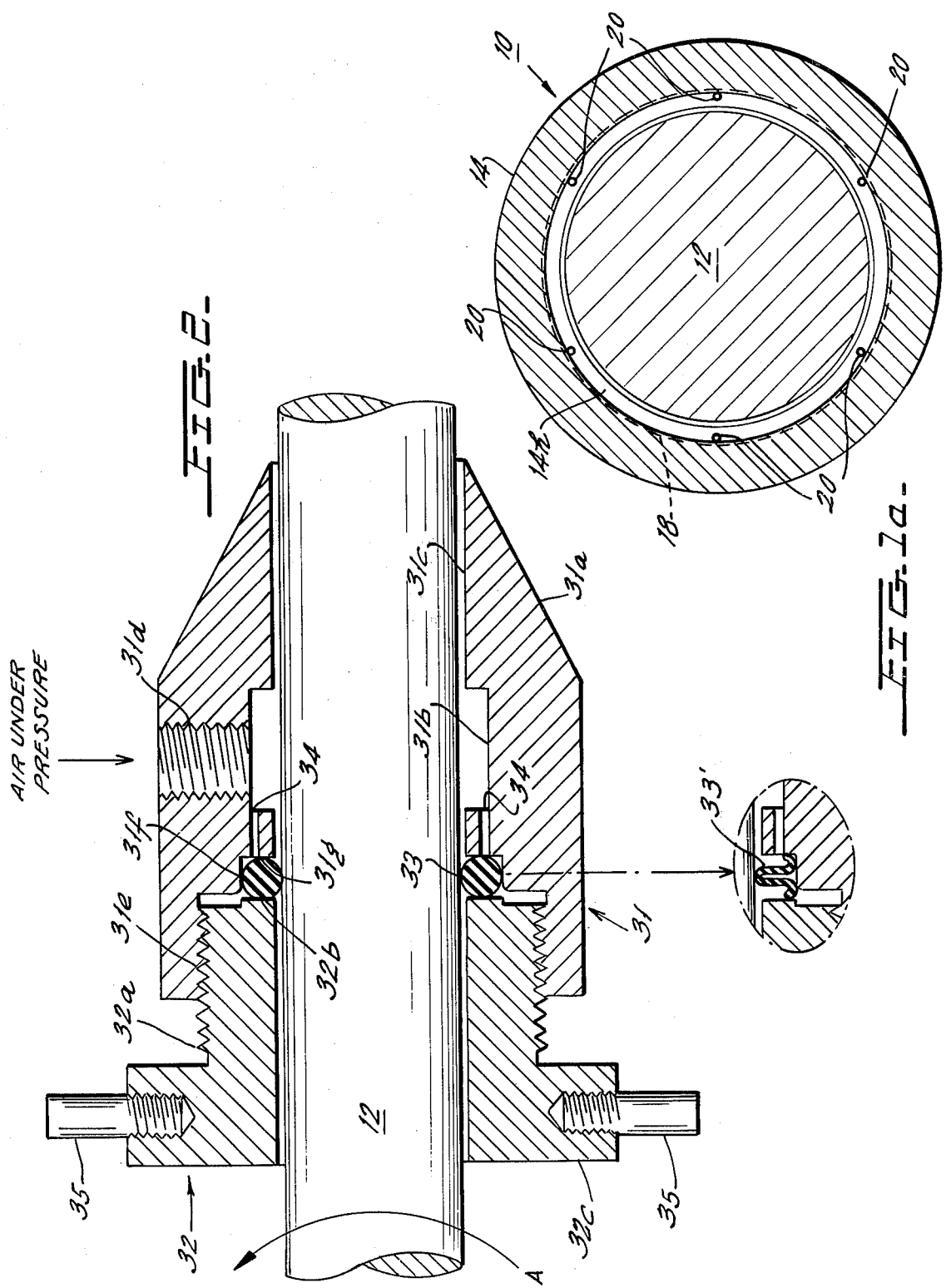

METHOD AND APPARATUS FOR BREAKING AND STRIPPING HOSE FROM A MANDREL

BACKGROUND OF THE INVENTION

Many types of hose are formed on mandrels, for a variety of reasons, among which are the fact that hose of very large diameter and/or wall thickness and hose comprised of a plurality of layers of different material make other methods, such as extrusion, impractical. Even some extruded hose is formed using a mandrel to provide adequate shaping support during cooling.

Formation of hose on a mandrel is typically done in the following manner:

The mandrel is usually a rod of circular cross-section and of the order of 25 to 100 feet in length. For multilayer hose, an applicator assembly (wrapper, extruder, etc.) applies each layer one at a time on the mandrel. ayer may be comprised of a resilient material (i.e., rubber), cloth, metal wire or braid, cloth strips or threads, etc.

After the last layer is formed, the resulting hose structure is cured to "fuse" adjacent layer of resilient material to one another. After "curing" the hose is allowed to cool and is then "stripped" (i.e. removed) from the mandrel.

The stripping operation is a tedious, time-consuming activity. One technique employed is to provide radially aligned holes at a plurality of locations along the mandrel and communicating with one another by a common axially aligned hole provided in the mandrel. Air under pressure is provided to "break" the hose away from the mandrel. This arrangement provides the hose with an undesirably rough interior surface. Also the resilient material may tend to enter the holes and thereby block air from entering the region between the hose and the mandrel. Also the holes which are exposed as the hose is moved axially along the mandrel tend to release the maximum amount of air under pressure resulting in significantly reduced air pressure being directed to those holes still lying beneath the hose, thus reducing the effectiveness of the operation.

Another technique employs a mandrel having elongated grooves extending parallel to the longitudinal axis and along the surface of the hose. This technique suffers the same defects as the prior technique described above. It thus becomes important to provide a technique and apparatus for simply and rapidly removing hose from a mandrel having a smooth finished outer surface.

BRIEF DESCRIPTION OF THE INVENTION

The shortcomings of prior art approaches to the problem of breaking and stripping a hose from a mandrel have been resolved by the method and apparatus of the present invention which comprises the employment of an annular shaped nozzle slidably mounted upon the mandrel and having a first tapered end which is wedged beneath one end of the hose. A annular shaped hollow space defined and cooperatively formed by the interior surface of the nozzle and the exterior surface of the mandrel, directs air under pressure beneath the hose to break the hose away from the mandrel.

The nozzle is axially moved along the mandrel pushing the hose along, and thereby stripping the hose from the mandrel. The opposite end of the mandrel is provided with a "sliding seal" which substantially prevents air under pressure from escaping from beneath the nozzle in a direction away from the hose. If desired, the nozzle may be rotated as it is moved axially relative to the mandrel.

OBJECTS AND BRIEF DESCRIPTION OF THE FIGURES

It is therefore one object of the invention to provide a novel method and apparatus for breaking and stripping hose from a mandrel having a smooth outer surface.

Another object of the present invention is to provide a novel apparatus for breaking and stripping hose from a mandrel comprising a nozzle wedged beneath one end of the hose and provided with an annular conduit for directing air under pressure between the interior surface of the hose and the exterior surface of the mandrel.

Another object of the present invention is to provide a nozzle of the type set forth in the previous object and further having a sliding seal for preventing the air under pressure from being directed away from the region beneath said hose interior surface to thereby enhance the effectiveness of the nozzle and hence greatly facilitate the breaking and stripping operations.

The above, as well as other objects of the invention will become apparent when reading the accompanying description and drawings, in which:

FIG. 1 is a sectional view of a nozzle assembly for breaking and stripping hose from a mandrel in accordance with the principles of the present invention.

FIG. 1a shows a sectional view of FIG. 1 looking in the direction of arrows 1a—1a.

FIG. 2 is a sectional view showing an alternative embodiment of the invention.

DETAILED DESCRIPTION OF THE INVENTION

FIG. 1 shows apparatus 10 for stripping hose 11 from mandrel 12. The apparatus is primarily comprised of a nozzle assembly 13. The mandrel is usually of the order of 25–100 feet long and has a circular cross-section, typically of the order of the inner diameter of the hose being formed. The present invention may, however, be used with non-circular hose and mandrels as will become evident from the following description.

The hose 11 has been shown for purposes of simplicity as being of a single layer, but may be of any hose construction, especially of the type adapted for formation on a mandrel.

The nozzle assembly 13 is comprised of a substantially cylindrical body 14 having a hollow interior adapted for slidably receiving mandrel 12. The right-hand end is provided with a tapered portion of 14a for wedging purposes, and as will be more fully described.

A substantially circular shaped disc member 15 is welded to member 14 as shown at 15a and is utilized as a stop plate in a manner to be more fully described.

The member 14 is provided with a radially aligned tapped recess 14b and a radially aligned tapped bore 14c each being adapted to threadedly engage rods 16 and 17, respectively, which rods are employed as pulling handles, as will be more fully described. Rod 17 is provided with an axial bore 17a adapted to serve as a conduit for delivering air under pressure to the nozzle assembly, as will be more fully described. The mandrel 17 may be provided with a coupler 17b for coupling a resilient hose member or the like to connect the supply of air under pressure (not shown) to handle 17.

The interior surface of member 14 is provided with a right-hand surface portion 14d of a diameter $D_1$ which is at least slightly greater than the diameter D of mandrel 12. The intermediate surface portion 14e is provided with a diameter $D_2$, where $D_2 > D_1$.

The left-hand side wall 14h of the recessed interior surface portion 14e is provided with a plurality of equally spaced substantially parallel axially aligned openings 20 which communicate between the recess 14e and an annular groove 14f provided for receiving a resilient O-ring 18. See FIG. 1a. A similar set of equally spaced substantially parallel axially aligned openings 21 communicate between one wall of groove 14f and the adjacent wall of a similar groove 14g formed in the interior surface of member 14 and adapted to receive O-ring 19.

The operation of the structure of FIG. 1 is as follows:

The tapered edge 14a is wedged beneath the interior surface 11a of hose 11 in the manner shown, preferably until the left-hand edge of the hose body wall abuts against stop plate 15. Stop plate 15 is employed for stripping hose of more flexible and/or light body wall construction and may be omitted from the nozzle assemblies utilized for removing hose of less resilient and/or heavier and/or thicker body wall construction.

After the nozzle has been adequately wedged beneath the adjacent end of hose 11 as shown, the air under pressure and typically of a pressure in the range from 80–100 psi, is introduced into the conduit 17a of handle 17. The air enters through conduit 17a and bore 14c whereupon it fills the hollow annular space defined by the exterior surface of mandrel 12, the O-rings 18 and 19, the recess 14e, the recess 14d and at least that surface portion of the hose which has been partially lifted away from mandrel 12.

The air under pressure also enters into axially aligned openings 20 which communicate with recess 14f, the holes 20 being positioned so as to urge O-ring 18 inwardly toward engagement with the surface of mandrel 12. Any air escaping or passing between the recess 14f and O-ring 18 passes through the axially aligned openings 21 and into recess 14g to similarly urge the second O-rings 19 toward engagement with mandrel 12. Thus, the O-rings and axially aligned openings cooperatively function to form a substantially airtight seal to prevent air under pressure from escaping outwardly along the left-hand edge of the nozzle assembly member 14, thus causing substantially all of the air under pressure to be urged beneath hose 11.

The air under pressure causes the hose to break away from the surface of mandrel 12 and to be lifted away from the surface at least slightly thereby greatly facilitating the stripping operation. The hose is stripped from mandrel 12 by moving the nozzle assembly 13 axially toward the right in the embodiment shown in FIG. 1 such that the stop plate 15, which abuts the left-hand end of hose 11, causes the hose to be pushed toward the right in order to be stripped from the mandrel. In cases where substantial forces must be provided to strip the hose from the mandrel, a motor or power operated winch (not shown for purposes of simplicity) may be coupled to drive a pair of elongated chains 25 and 26 attached to the drum of the winch at their right-hand ends (by suitable means not shown) and having their left-hand ends coupled to handles 17 and 16 by metallic rings 25a and 26a, the operation of the winch in winding up the chains 25 and 26 to pull the nozzle assembly 13 to the right thereby stripping the hose from the mandrel. Obviously, more than two chains and cooperating handles may be employed, if desired.

The groups of openings 20 and 21 and the O-rings 18 and 19 cooperate to provide a "sliding seal" continuously maintaining the air-tight condition as the nozzle assembly is "walked" to the right during the hose stripping operation.

FIG. 2 shows an alternative embodiment of the present invention in which the nozzle assembly is comprised of a first substantially cylindrical member 31 having a tapered right-hand edge 31a, an internal centrally located recess 31b and a right-hand interior surface portion 31c which is of slightly greater diameter than the mandrel 12. The radially aligned tapped bore 31d is provided to couple an air supply to the interior recess 31b.

The left-hand end of member 31 is provided with a tapped interior surface portion 31e and a notched portion comprised of a cylindrical surface 31f and a flat radially aligned surface 31g spaced inwardly from tapped portion 31e.

The tapped portion 31e cooperates with the threaded portion 32a of cooperating nozzle assembly member 32 whose right-hand end wall 32b cooperates with surfaces 31f and 31g to define a substantially U-shaped continuous annular recess for receiving either resilient O-ring 33 or a U cup packing shown in cross-section as 33' and typically formed of neoprene. Member 32 is adequately tightened within member 31 to secure the U cup packing therein (or the O-ring, as the case may be). The sliding seal is maintained by adjusting the threadedly connected portions 31e–32c to control the compression of the O-ring 33 (or packing as the case may be).

The left-hand end of member 32 is provided with a flange portion 32c having tapped bores for threadedly receiving and engaging the threaded ends of rods 35 to serve as the "pulling" rods in a manner similar to that of the rods or handles 16 and 17 of FIG. 1.

As an added option, a plurality of equally spaced substantially parallel axially aligned openings may be arranged to communicate between recess 31b and the recess for receiving O-ring 33 to urge O-ring 33 (or the U cup packing) towards intimate sliding engagement with the surface of mandrel 12 when air under pressure is coupled to the nozzle assembly opening 31d.

The operation of the alternative embodiment of FIG. 2 is substantially identical to that of FIG. 1 for the purpose of breaking and stripping hose from a mandrel with the exception that the removable member 32 facilitates adjustment of the sliding seal and disassembly and replacement of O-rings or U-cup packings, as the case may be.

The nozzle assembly of either FIG. 1 or FIG. 2 may be rotated as it is "walked" along the mandrel to further facilitate the breaking and stripping operation. Alternatively, the mandrel may be rotated relative to the nozzle to accomplish the same result. Such rotation may be either periodic or continuous. Alternatively, the mandrel may be rotated by suitable means (see arrow A) either periodically or continuously while the nozzle is maintained stationary and, if desired, both elements may be rotated in reverse directions to facilitate the breaking and stripping operations.

In instances where neither mandrel nor nozzle means is rotated, it is possible to design the nozzle assembly with a cross-sectional configuration which is other than substantially circular so that if applications exist wherein the hose to be formed is elliptical shaped, for example, the nozzle assembly may be designed to have a cross-sectional configuration adapted to conform to such elliptical shape and thereby by advantageously utilized to break and strip hose of non-circular cross-sectional configuration from a mandrel of a similar contour.

Although there has been described a preferred embodiment of this novel invention, many variations and modifications will now be apparent to those skilled in the art. Therefore, this invention is to be limited, not by the specific disclosure herein, but only by the appending claims.

What is claimed is:

1. A method for breaking and completely stripping hose from a mandrel upon which the hose was formed wherein the hose comprises an elongated solid resilient member on said mandrel which it is desired to be removed therefrom, comprising the steps of:

providing an annular shaped nozzle means having an opening adapted to receive the mandrel therethrough and having a tapered first end, and providing the opening with an interior contour conforming to and at least slightly larger than the contour of the outer surface of the mandrel;

positioning the nozzle means upon the mandrel so that the mandrel extends through said opening and continuously axially moving the nozzle means tapered edge toward the adjacent end of the hose to be stripped from the mandrel;

wedging the tapered end of the nozzle means beneath the hose so that at least a portion of the tapered end enters between the interior surface of the mandrel;

introducing air under pressure into the region between the interior surface of the nozzle means and the exterior cylindrical surface of the mandrel and providing a sliding seal at the end of the nozzle means remote from the hose so that substantially all of the air under pressure delivered to the nozzle means enters between the interior surface of the hose and the exterior surface of the mandrel to at least slightly lift the hose away from the mandrel exterior surface;

moving the nozzle means axially along the mandrel so as to push the hose therealong and thereby completely strip the hose from the mandrel.

2. The method of claim 1 further comprising the step of imparting rotation to either said mandrel or said nozzle means so that one of said elements rotates relative to the other to facilitate the breaking and stripping operation.

3. A nozzle assembly for breaking and completely stripping a hollow substantially air-tight hose from a mandrel upon which the hose has been formed and without breaking or otherwise damaging the hose comprising:

a hollow annular shaped nozzle means adapted to encircle the mandrel and being provided with a first tapered end adapted to be wedged beneath the adjacent end of the hose so as to enter between the exterior surface of the mandrel and the interior surface of the hose to be stripped from the mandrel;

the annular interior surface of said nozzle means confronting the surface of the mandrel defining a recess being spaced a small finite distance from the surface of the mandrel so that the mandrel surface and the recessed portion of the nozzle means cooperatively define a hollow interior annular shaped region;

said nozzle means further including conduit means extending between the exterior surface of the nozzle and said recess for coupling air under pressure into said hollow space;

the end of said nozzle means opposite said tapered portion including sealing means for providing a sliding seal between said mandrel and said nozzle means to prevent air from escaping from the region between said nozzle means and said mandrel which is remote from the hose and thereby direct substantially all of the air under pressure led into said hollow recess into the region between the interior surface of the hose to be stripped and the cylindrical surface of the mandrel.

4. The device of claim 3 further comprising handle means secured at spaced intervals around said nozzle means to facilitate axial movement of the nozzle means relative to the mandrel in order to strip the hose from the mandrel.

5. The device of claim 4 further comprising power operated means for pulling said nozzle means and elongated chain means for coupling said power operated means to said handle in order to pull the nozzle means in the stripping direction.

6. The device of claim 3, wherein the means for providing the sliding seal is comprised of a resilient O-ring;

said nozzle means including means for receiving and supporting said O-ring in the region between the exterior cylindrical surface of the mandrel and the confronting interior surface of the nozzle means.

7. The device of claim 6, wherein said nozzle means further comprises a plurality of conduit means communicating between said recess and said O-ring receiving means for urging said O-ring toward intimate sliding engagement with the exterior cylindrical surface of the mandrel.

8. The device of claim 3 further comprising a continuous flange surrounding the nozzle means and secured to the nozzle means in the region of said tapered portion and adapted to abut the adjacent end of a hose when the nozzle means tapered portion is wedged beneath the hose.

9. The device of claim 3, wherein said nozzle means is comprised of first and second substantially cylindrical shaped hollow members, the first one of said members having a female coupling portion and the second one of said members having a male coupling portion, said first and second members threadedly engaging one another;

the interior surface portion of the member having the female threaded portion being provided with a shoulder cooperating with the adjacent end of the second member having the male threaded portion to form an annular shaped groove which constitutes the means for receiving and supporting said O-ring.

10. The device of claim 4, wherein one of said handle means is provided with a conduit cooperating with the bore in said nozzle means to collectively comprise the means for delivering air under pressure to the recess of said nozzle means.

11. The device of claim 3, wherein the means for providing the sliding seal is comprised of U cup packing means;

said nozzle means including means for receiving and supporting said U cup packing means in the region between the exterior cylindrical surface of the mandrel and the confronting interior surface of the nozzle means.

12. The device of claim 3, wherein the interior configuration of the hose, the mandrel and opening of said nozzle means are non-circular.

* * * * *